May 20, 1952 W. H. ROMEL 2,597,379
PORTABLE DUAL CONTROL DEVICE
Filed March 7, 1950
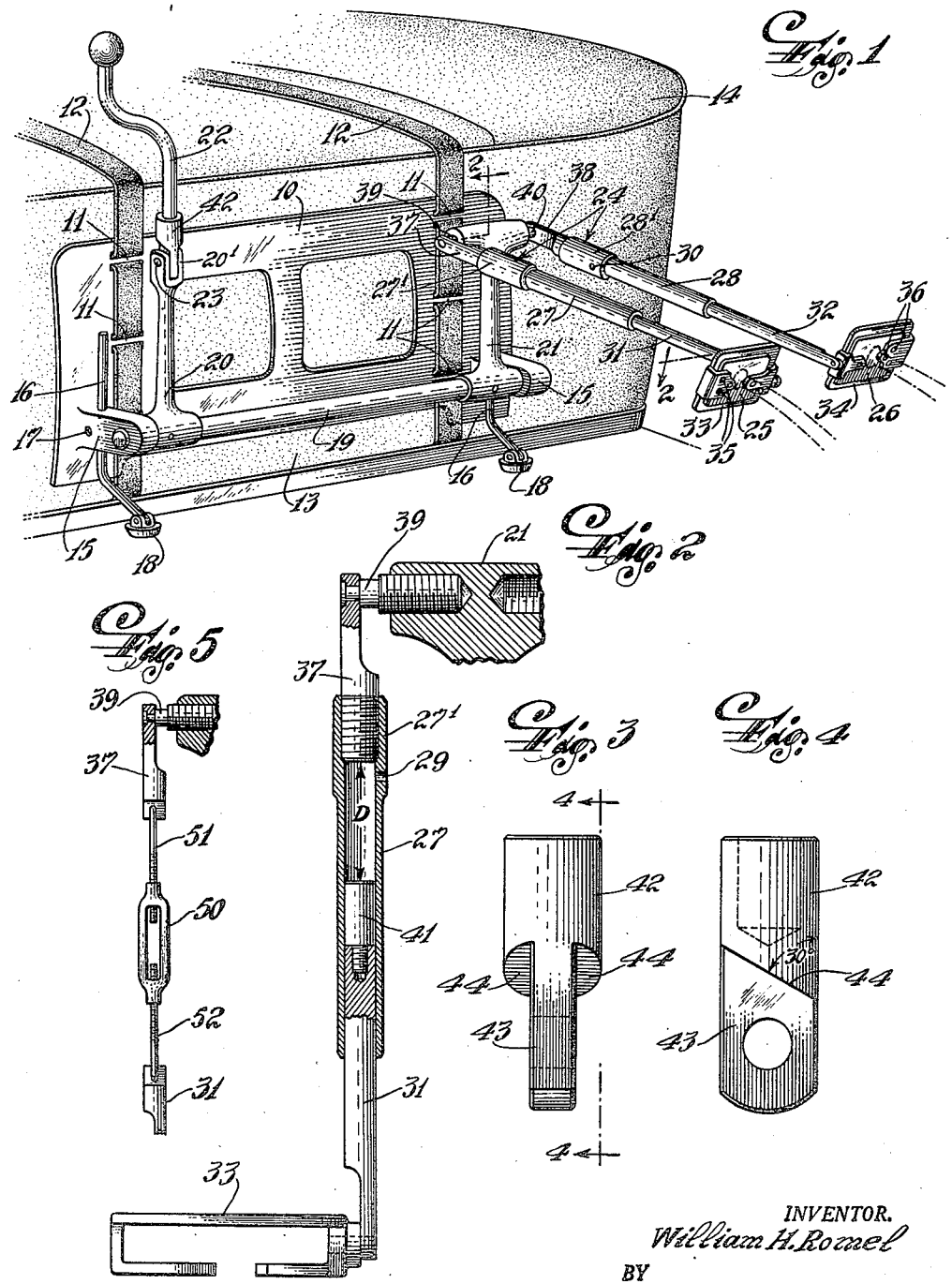
INVENTOR.
William H. Romel
BY
ATTORNEY Patented May 20, 1952

2,597,379

UNITED STATES PATENT OFFICE 2,597,379

PORTABLE DUAL CONTROL DEVICE

William H. Romel, Montclair, N. J.

Application March 7, 1950, Serial No. 148,079

2 Claims. (Cl. 74—481)

1

This invention relates to a dual control device for automotive vehicles, and more particularly, to such device adapted especially for use by driving instructors.

The device of the instant invention embodies features of assembly and operation which are novel in dual control devices, and which make the device highly practical and efficient in operation.

Dual control devices of various types have been proposed and used by driving instructors; such devices are usually installed on the cars of automotive driving instructors. Such installations, however, have been of a permanent nature, do not embody the features of my device, and are objectionable in that the student, having mastered the driving of the instructor's automotive vehicle, is obliged to undergo a certain period of adjustment in accommodating himself to the controls of the particular automotive vehicle which he owns or proposes to drive. The device of the instant invention is portable in nature and is adapted to be applied with equal efficacy directly to the automotive vehicle of the student so that instruction may be had from the very beginning on that vehicle, eliminating the period of adjustment and accommodation necessitated by devices heretofore used.

The invention is adapted to compensate for differences in juxtaposition of the various parts of an automotive vehicle. These differences vary widely according to the type of automotive vehicle and the manufacturer and according to the style changes which are made from year to year.

The foregoing and other advantageous objects will appear from a consideration of the description hereinafter and from the drawing, illustrating one of many forms in which the invention may be embodied, and wherein:

Fig. 1 is a perspective view, showing the application of the device of my invention to the seat of an automotive vehicle, the latter being indicated fragmentarily, the device of my invention being shown applied to the control pedals of such vehicle, Fig. 2 is an enlarged, fragmentary, sectional view, taken on line 2—2 of Fig. 1, Fig. 3 is an end elevational view of the lever coupling member shown in Fig. 1, Fig. 4 is a side elevational view thereof, taken on line 4—4 of Fig. 3, and Fig. 5 is an enlarged sectional view, generally corresponding to Fig. 2, of a modified form of the invention.

As shown in the drawings, the device of my in-

2 vention comprises an adapter plate 10 which may be of any desired or convenient form and which may be secured directly against the front wall 13 of the seat 14 of the automotive vehicle by straps 12 or the like passing through the loops 11 slitted portions or the like on such plate. The plate is provided with upstanding bearings 15 having apertures through which pass the support rods 16, said bearings being provided with set screws 17 or the like by means of which the support rods may be adjusted in said bearings so that the free lower ends of said rods (to which the rod shoes 18 are pivoted) may be positioned on the floor of the automotive vehicle. It will be apparent that this arrangement will permit a vertical adjustment of the parts to the proper position required for the particular vehicle.

A rocker shaft 19 is rotatably journalled in the bearings 15, an operating lever crank 20 and a linkage crank 21 being keyed to said shaft. An operating lever handle 22 is secured as at 23 to the operating lever crank 20. A linkage assembly 24 is secured to the linkage crank 21 at one end, and, at the opposite end, to the control pedals of the automotive vehicle, as will be presently more particularly described. Said linkage assembly comprises link operating sleeves 27 and 28, having socket portions 27'—28', provided with air vents 29 and 30. Link operating rods 31—32 are slidably positioned in said sleeves 27, 28, the free ends of said rods having secured thereto pedal clamps 33 and 34 which are adapted to be secured to the control pedals 25 and 26 of the automotive vehicle by set screws 35 and 36 or the like. Link swivel studs 37 and 38 are secured to the socket portions of said sleeves, and link studs 39 and 40 are secured to the linkage crank 21, and are pivotally secured to said link swivel studs 37 and 38.

By the arrangement described, it will be apparent that, when (at any time) the instructor desires to operate the dual control mechanism, he need only move the operating lever handle 22 forwardly to depress the automotive control pedals 25 and 26; at the same time, as the link operating rods 31 and 32 are freely positioned in the sleeves 27 and 28, the student may normally operate the control pedals 25 and 26 in the usual fashion without actuating or being hindered by the control mechanism.

Stop members 41 may be secured to the ends of the link operating rods within the sleeves so that by providing a series of stop members of varying lengths, the distance D between the stop members and the ends of link swivel studs 37, 38, which is the distance of free movement of the sleeves over the rods before engagement of the studs 37 therewith, on actuation of the dual control mechanism, may be varied as desired. This distance is indicated in Fig. 2, as D, and while the same objective may be accomplished by providing link operating rods 31, 32 of varying lengths, or by varying the lengths of the swivel studs 37 and 38, the expedient of providing stop members 41 of different lengths is a convenient and simple one. Thus, as will be appreciated, it is possible to provide for the engagement of the control pedal 26 before the control pedal 25 is engaged upon actuating the dual control device, or the reverse arrangement may be provided by the same expedient, or, if it is desired, the control pedals 25 and 26 may be caused to be depressed simultaneously by the dual control mechanism. Simultaneous depression may be achieved by providing stud members 41 of equal length for the link operating rods 31 and 32.

If desired, the operating lever handle 22 may be so secured to the operating lever crank 20 as to enable the crank to be rotated while the handle 22 is moved out of true axial alignment therewith. This is desirable in the case of an automotive vehicle having dashboards or other parts which would be in the path of the operating lever handle 22 if said handle was in the extended axial line of the operating lever 20.

As shown in Figs. 1, 3 and 4, the operating lever handle 22 is secured to a lever coupling 42 having a tongue portion 43 depending therefrom and defined by the chamfer edges 44 which are preferably disposed at an acute angle (for example, a 30° angle, or other angle found suitable for that purpose) as shown in Fig. 4. By the arrangement described, when the operator desires to rotate the linkage crank 20, he may do so while moving the lever 22 backwardly until the chamfer edges 44 of said lever abut the forked end 20' of the operating crank 20.

While I have shown and described the use of two link operating sleeves 27 and 28 in connection with the control pedals 25 and 26 of the automotive vehicle, it will be apparent that the device may be made with only one such operating sleeve where it is desired to control only one pedal. By the same token, the number of operating sleeves may be increased if it is desired to control more than two pedals.

In Fig. 5, I have shown an arrangement wherein the link operating rod 31 and swivel stud 37 are connected by a turnbuckle 50 engaging the threaded rods 51, 52, fixed to said rod 31 and swivel stud 37. By this arrangement, the distance between linkage 21 and pedal 33 may be readily adjusted and fixed to accommodate the device to the car to which it is applied. The same arrangement may be used in connection with pedal 34.

Having thus described my invention, what I claim as new and desire to secure by Letters Patent, is:

1. A dual control device for a motor vehicle comprising an adaptor plate of dimensions adapting it to fit against the front wall of a vehicle seat in spaced relation to upper and lower edges thereof, bearing brackets on said plate projecting forwardly therefrom adjacent opposite ends of the lower edge portion thereof, a rocker shaft extending horizontally between and rotatably supported at its ends in said brackets, an operating crank secured to and extending upwardly from said shaft adjacent one end thereof for rotation of the shaft by movement of the operating crank forwardly and downwardly, a linkage crank secured to and extending upwardly from said rocker shaft adjacent the other end of the shaft, said linkage crank having a horizontal cross head projecting from opposite ends of its upper end, a spindle secured to and projecting from an end of said cross head, a rod pivotally connected at one end to said spindle and extending forwardly therefrom, and a pedal clamp pivoted to the front end of the rod for connecting the rod to an automotive control pedal.

2. In a dual control device for a motor vehicle as set forth in claim 1, supporting rods slidable through openings in said brackets and releasably secured in adjusted positions, and adjustable floor-engaging members at lower ends of said rods.

WILLIAM H. ROMEL.

REFERENCES CITED

The following references are of record in the file of this patent:

UNITED STATES PATENTS

| Number | Name | Date |
|---|---|---|
| 918,680 | Krouse | Apr. 20, 1909 |
| 1,275,706 | Langolf | Aug. 13, 1918 |
| 1,326,377 | Stocking | Dec. 30, 1919 |
| 1,420,290 | Schofield | June 20, 1922 |
| 1,482,973 | Cramer | Feb. 5, 1924 |
| 1,585,855 | Hawn | May 25, 1926 |
| 1,801,987 | Strand | Apr. 21, 1931 |
| 1,906,366 | Burns | May 2, 1933 |

FOREIGN PATENTS

| Number | Country | Date |
|---|---|---|
| 718,990 | France | Jan. 30, 1932 |